US012536237B2

(12) United States Patent
Yang

(10) Patent No.: US 12,536,237 B2
(45) Date of Patent: Jan. 27, 2026

(54) METHOD FOR BOOK PUSHING, METHOD FOR GENERATING BOOK RECOMMENDATION TEXT, APPARATUS, AND ELECTRONIC DEVICE

(71) Applicant: Beijing Zitiao Network Technology Co., Ltd., Beijing (CN)

(72) Inventor: Yan Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/529,940

(22) Filed: Dec. 5, 2023

(65) Prior Publication Data
US 2024/0202260 A1    Jun. 20, 2024

(30) Foreign Application Priority Data
Dec. 19, 2022   (CN) .......................... 202211632551.0

(51) Int. Cl.
*G06F 16/95*     (2019.01)
*G06F 16/9535*   (2019.01)
(Continued)

(52) U.S. Cl.
CPC ...... *G06F 16/9535* (2019.01); *G06F 16/9532* (2019.01); *G06F 16/9536* (2019.01)

(58) Field of Classification Search
CPC ............. G06F 16/9535; G06F 16/9536; G06F 16/9532
See application file for complete search history.

(56) References Cited

U.S. PATENT DOCUMENTS

2009/0157667 A1*  6/2009  Brougher ................ G06F 16/25
                                                707/999.005
2009/0254802 A1   10/2009  Campagna et al.
(Continued)

FOREIGN PATENT DOCUMENTS

CN       106897284 A     6/2017
CN       110536177 A    12/2019
(Continued)

OTHER PUBLICATIONS

Alpcan, T., "A Template and Suggestions for Writing Easy-to-Read Research Articles," Arxiv, Jul. 29, 2019, 5 pages, Retrieved from the Internet URL: https://arxiv.org/abs/1907.12204.
(Continued)

*Primary Examiner* — Loc Tran
(74) *Attorney, Agent, or Firm* — Alleman Hall & Tuttle LLP

(57) ABSTRACT

Embodiments of the present disclosure provide a method for book pushing, a method for generating a book recommendation text, an apparatus, and an electronic device. The method for book pushing comprises: obtaining a first book; determining, according to related features of the first book, a target book in at least one second book, the second book and the first book being written by the same author; determining, according to contents of the target book and/or the first book, a recommendation text; generating, according to the recommendation text and related information of the target book, a book recommendation text of the target book; and pushing the book recommendation text to the reader. The method establishes, according to the related features of the first book currently read by the reader, correlations with the target book, and generates the book recommendation text containing the recommendation text.

20 Claims, 7 Drawing Sheets

(51) Int. Cl.
*G06F 16/9532* (2019.01)
*G06F 16/9536* (2019.01)

(56) References Cited

U.S. PATENT DOCUMENTS

| | | | |
|---|---|---|---|
| 2015/0113399 A1* | 4/2015 | Bilinski | G06F 16/40 715/716 |
| 2016/0078471 A1 | 3/2016 | Hamedi | |
| 2016/0148433 A1 | 5/2016 | Petrovskaya et al. | |

FOREIGN PATENT DOCUMENTS

| | | | |
|---|---|---|---|
| CN | 110717030 | A | 1/2020 |
| CN | 113177160 | A | 7/2021 |
| CN | 113867599 | A | 12/2021 |
| CN | 114238618 | A | 3/2022 |
| CN | 114297519 | A | 4/2022 |
| CN | 114547463 | A | 5/2022 |
| CN | 114817726 | A | 7/2022 |
| CN | 115982393 | B | 5/2025 |
| JP | 2016071741 | A | 5/2016 |
| KR | 20210103742 | A | 8/2021 |
| KR | 102416158 | B1 | 7/2022 |
| WO | 2009136411 | A2 | 11/2009 |
| WO | 2015130555 | A1 | 9/2015 |

OTHER PUBLICATIONS

Wu, Z., "Research on the Precise Push Service of Domestic Publishing Academic Journals," Master of Publishing Thesis, Nanjing University, School of Information Management, Feb. 15, 2021, 64 pages.

China National Intellectual Property Administration, First Office Action for Chinese Application No. 202211632551.0, mailed on Nov. 29, 2024, 20 pages.

* cited by examiner

METHOD FOR BOOK PUSHING, METHOD FOR GENERATING BOOK RECOMMENDATION TEXT, APPARATUS, AND ELECTRONIC DEVICE

CROSS-REFERENCE TO RELATED APPLICATION(S)

This application claims priority to Chinese Application No. 202211632551.0 filed Dec. 19, 2022, the disclosure of which is incorporated herein by reference in its entity.

FIELD

The present disclosure relates to the field of computer technology, and more specifically, to a method for book pushing, a method for generating a book recommendation text, an apparatus, and an electronic device.

BACKGROUND

E-book reading, in replacement of traditional paper book reading, has become a popular way of reading due to its huge book storage capacity, portability, convenience and cost-saving advantages. Users may read books, novels and articles through devices, like mobile phones, tablet computers and E-book anytime anywhere.

In order to keep the readership and attract more readers to read through a reading application, the reading application will actively recommend other books to the reader when the reader is about to read or already read the current book. For example, a new book may be recommended to the current reader. At present, the method for pushing other books is implemented only by displaying covers of several other books at the last page or at the end of the current book. Such recommendation method is monotonous and could not effectively attract the readers to continue to read. The effect of book pushing is unsatisfactory.

SUMMARY

To attract readers to continue to read and enhance the efficiency in book pushing, embodiments of the present invention provide a method for book pushing, a method for generating a recommendation text, an apparatus, and an electronic device. Specifically, the technical solution includes:

In a first aspect, embodiments of the present invention provide a method for book pushing, comprising:
  obtaining a first book, the first book being a book currently read by a reader;
  determining, according to related features of the first book, a target book in at least one second book, the second book and the first book being written by the same author;
  determining, according to contents of the target book and/or the first book, a recommendation text;
  generating, according to the recommendation text and related information of the target book, a book recommendation text of the target book; and pushing the book recommendation text to the reader.

In a second aspect, embodiments of the present invention further provide a method for
  generating a book recommendation text, comprising:
  receiving a book recommendation text including a recommendation text and related information of a target book, the target book and a first book being written by the same author;
  obtaining a related location of the first book on an editable area of a display interface;
  receiving an editing operation of an author and inserting the book recommendation text at the related location of the first book.

In a third aspect, embodiments of the present invention further provide an apparatus for book pushing, comprising:
  an obtaining unit for obtaining a first book, the first book being a book currently read by a reader;
  a determining unit for determining, according to related features of the first book, a target book in at least one second book, the second book and the first book being written by the same author;
  a processing unit for determining, according to contents of the target book and/or the first book, a recommendation text;
  a generating unit for generating, according to the recommendation text and related information of the target book, a book recommendation text of the target book;
  a pushing unit for pushing the book recommendation text to the reader.

In a fourth aspect, embodiments of the present invention further provide an apparatus for generating a book recommendation text, comprising:
  a receiving unit for receiving a book recommendation text including a recommendation text and related information of a target book, the target book and a first book being written by the same author;
  an obtaining unit for obtaining a related location of the first book on an editable area of a display interface;
  an inserting unit for inserting, based on an editing operation by an author and at the related location of the first book, the book recommendation text.

In a fifth aspect, embodiments of the present invention further provide an electronic device comprising a memory and a processor, wherein the memory stores therein computer program instructions;
  the processor, when executing the computer program instructions, implements the method according to the first aspect or the second aspect.

Optionally, the electronic device is a terminal device or a network device, like server.

Besides, optionally, there is further provided a non-transitory computer-readable storage medium, stored thereon with computer programs; the computer programs, when executed by a processor, implement steps of the method according to the first aspect or the second aspect.

The method for book pushing provided by the embodiments determines, according to related features of a first book currently read by the readers, a target book in a plurality of second books, generates a recommendation text and a book recommendation text containing the recommendation text and the related information of the target book based on the contents of the target book and the first book, and finally pushes the book recommendation text to the readers. This method establishes, according to the related features of the first book currently read by the reader, correlations with the target book, and generates, according to the contents of the first book and the target book, the book recommendation text containing the recommendation tex. Since the target book recommended in the book recommendation text is relevant with the first book, the target book pushed is more pertinent. Therefore, the success rate of book pushing is increased, so as to ensure that the readership of the pushed book will not drop.

BRIEF DESCRIPTION OF THE DRAWINGS

Brief introduction of the drawings required in the description of the specific embodiments or the prior art are to be provided below to more clearly explain the technical solutions according to the embodiments of the present disclosure or in the prior art. It is obvious that the following drawings illustrate some implementations of the present disclosure and those skilled in the art also may obtain other drawings on the basis those illustrated ones without any exercises of inventive work.

DETAILED DESCRIPTION OF EMBODIMENTS

The technical solution of the present invention is to be described in a clear and complete manner with reference to the drawings. Clearly, the described embodiments are just part of the embodiments of the present invention, rather than all of them. Based on the embodiments in the present invention, all other embodiments obtained by those skilled in the art without any exercises of inventive work belong to the protection scope of the present invention.

It is to be explained that terms like "first" and "second" throughout the description, claims and drawings of the present application are provided to distinguish similar objects, without suggesting a particular sequence or order. It should be understood that the data used may be exchanged with each other under suitable conditions, such that the embodiments of the present disclosure described here can be implemented in an order except for those illustrated or described here. Besides, the terms "comprise" and "having" and any variants thereof are to be read as open-ended inclusion. For example, process, method, system, product or device containing a series of steps or unit is not restricted to those listed steps or units. Instead, they may include other steps or units not listed or inherent.

The technical solution of the embodiments of the present disclosure is to be introduced in details below.

Figure 1:
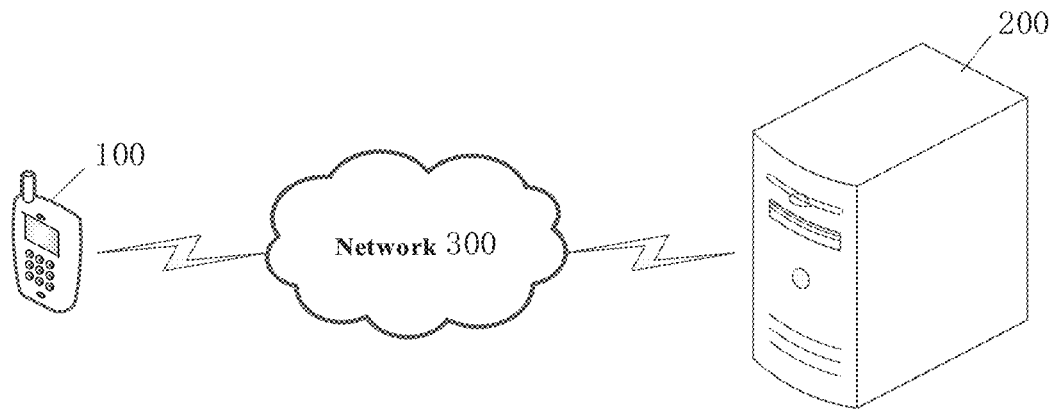
FIG. 1 illustrates an architecture diagram of a network system provided in the embodiments of the present invention.

Embodiments of the present disclosure provide a method for book pushing. The method may be applied to a network device shown by FIG. 1. According to FIG. 1, the system includes: a terminal device 100 and a server 200 communicatively linked with each other via a network 300. The server 200 may provide services (e.g., application services etc.) for clients mounted on the terminal device or the terminal. A database may be set on the server 200 or independent of the server 200 to provide data storage service for the server 200. In addition, a processing engine may run in the server 200 to perform steps executed by the server 200.

Optionally, the terminal device 100 may include, but not limited to, terminals capable of computing data, such as mobile terminal (e.g., mobile phone, tablet computer), notebook computer and PC (personal computer) etc. The above network 300 may include, but not limited to, wireless network or wired network, wherein the wireless network includes: Bluetooth, WIFI (Wireless Fidelity) and other networks that implement the wireless communications. The above wired networks may include, but not limited to: Wide Area Network, Metropolitan Area Network and Local Area Network. The above server 200 may include, but not limited to, any hardware devices capable of performing computations.

Besides, in this embodiment, the above search method also may be applied to an independent processing device with relatively strong processing power without requiring data exchange. For example, the processing device may be a terminal device with relatively strong processing power, i.e., respective operations in the above method for book pushing may be integrated in an independent processing device. The above is just an example and embodiments is not restricted in this regard.

Optionally, in this embodiment, the above methods for book pushing and for generating a book recommendation text may be executed by the server 200, or the terminal device 100 or collectively by the server 200 and the terminal device 100, wherein the terminal device 100 performs the method for book pushing according to the embodiments of the present disclosure, and the method for generating a book recommendation text may also be performed by a client mounted on the terminal device.

Figure 2:
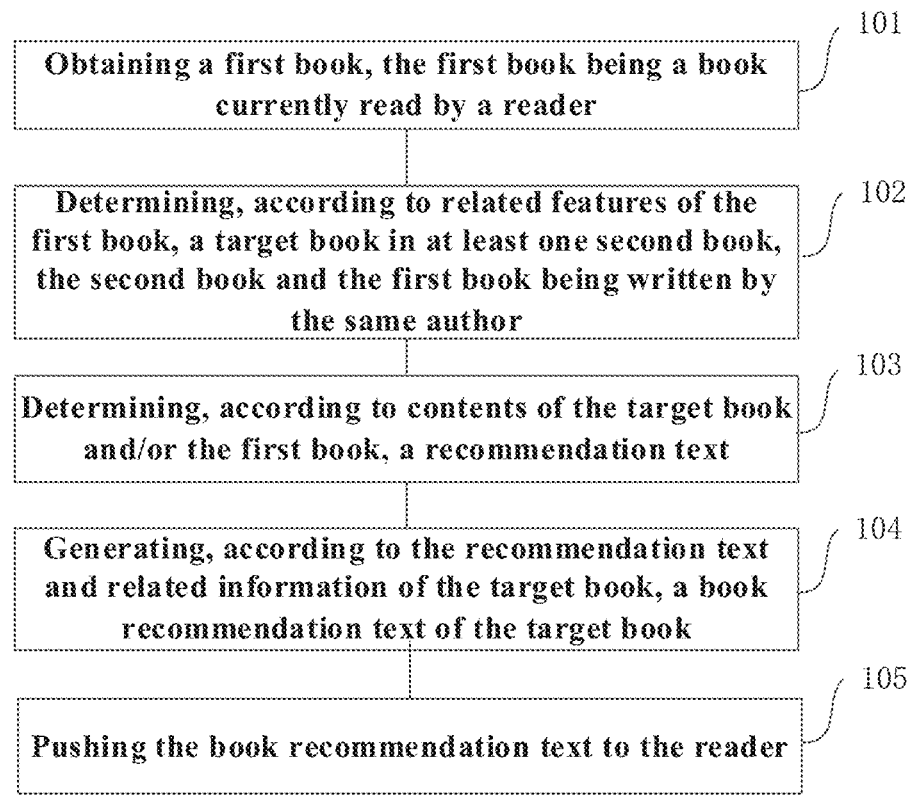
FIG. 2 illustrates a flowchart of a method for book pushing provided in the embodiments of the present invention.

This embodiment, for example, operates at the server 200. FIG. 2 is a flowchart for book pushing provided by embodiments of the present disclosure. As shown in FIG. 2, the flow of the method may include following steps:

Step 101: obtaining a first book, the first book being a book currently read by a reader.

For example, the reader reads the first book through an electronic book APP on the terminal device. The first book is any book provided by the electronic book APP.

Step 102: determining, according to related features of the first book, a target book in at least one second book, the second book and the first book being written by the same author.

Wherein the related features of the first book include book contents of the first book, book type of the first book, and reader comments on the first book among other information; and the at least one second book may be a finished book or a serialized book.

Specifically, the step 102 includes: determining, according to the related features of the first book, a book in at least one second book identical or similar to the first book as the target book. For example, the related features (such as book content, book type and reader comments) of the first book may be characterized by an attribute value and each second book also corresponds to an attribute value. Besides, if an identical or similar attribute value is calculated according to the attribute value of the first book and the attribute value of the at least second book through a preset algorithm, the target book may be determined.

For example, the first attribute value characterizes the book content of the first book. For example, the first book may be a classic work, such as "A Dream in Red Mansions" in a particular version. In such case, a book identical/similar to the first attribute value is searched in the at least one book. After searching, the target book is determined as "A Dream in Red Mansions" in other versions, a book related to comments on "A Dream in Red Mansions" or contents of "Reviews on A Dream in Red Mansions by Zhi Yanzhai".

For another example, the second attribute value characterizes the book type of the first book. If the first book is a fantasy novel, it corresponds to an attribute value of "01". Accordingly, a second book having the attribute value of "01" is searched in the attribute value corresponding to the at least one second book and the book is determined as the target book.

For a further example, the third attribute value characterizes reader comment information of the first book. For instance, the third attribute value is determined according to a comprehensive score result (e.g., 7.5 out of 10) rated by the reader after reading. Afterwards, a book having an attribute value above the third attribute value is selected from the at least one second book as the target book, wherein the attribute value corresponding to each second book may be determined by the platform according to factors such as reading review, comments and scores provided by the reader, or calculated through aggregating all reader scores by the algorithm. The specific methods for scoring are not restricted in this embodiment.

Step 103: determining, according to contents of the target book and/or the first book, a recommendation text.

Wherein the recommendation text may be determined based on contents, comments or related post contents of the first book and/or the target book, and is provided for generating the book recommendation text. Forms of the recommendation text include, but not limited to, text, picture, card and animation etc.

Optionally, one implementation includes: excerpting contents of brilliant segments, best chapters or fantastic comments from the first book according to the contents of the first book, and editing and processing the excerpts by the author to generate the book recommendation text. For example, an excerpt is taken from the first book as follows: "The land is divided into nine regions and the sky consists of nine scopes. What are the nine scopes? The first scope is planets inside and outside the solar system and the second is Kuiper Belt and Oort Cloud . . . ". The excerpt is regarded as a part of the recommendation text. Furthermore, a part of the content in the first book may be actively excerpted by the author, or the contents of chapters and paragraphs that are most forwarded or commented by the readers in the first book are regarded as the recommendation text.

Likewise, chapter contents of the target book, fantastic reader comments about the target book and plot reasoning in related forum posts about the target book may also be excerpted as the recommendation text.

Step 104: generating, according to the recommendation text and related information of the target book, a book recommendation text of the target book.

Wherein the related information of the target book includes: title of the target book, type of the target book and content of the target book. In this step, a recommendation text for the target book is generated according to the recommendation text, and title, content, type or abstract of the target book.

Figure 3:
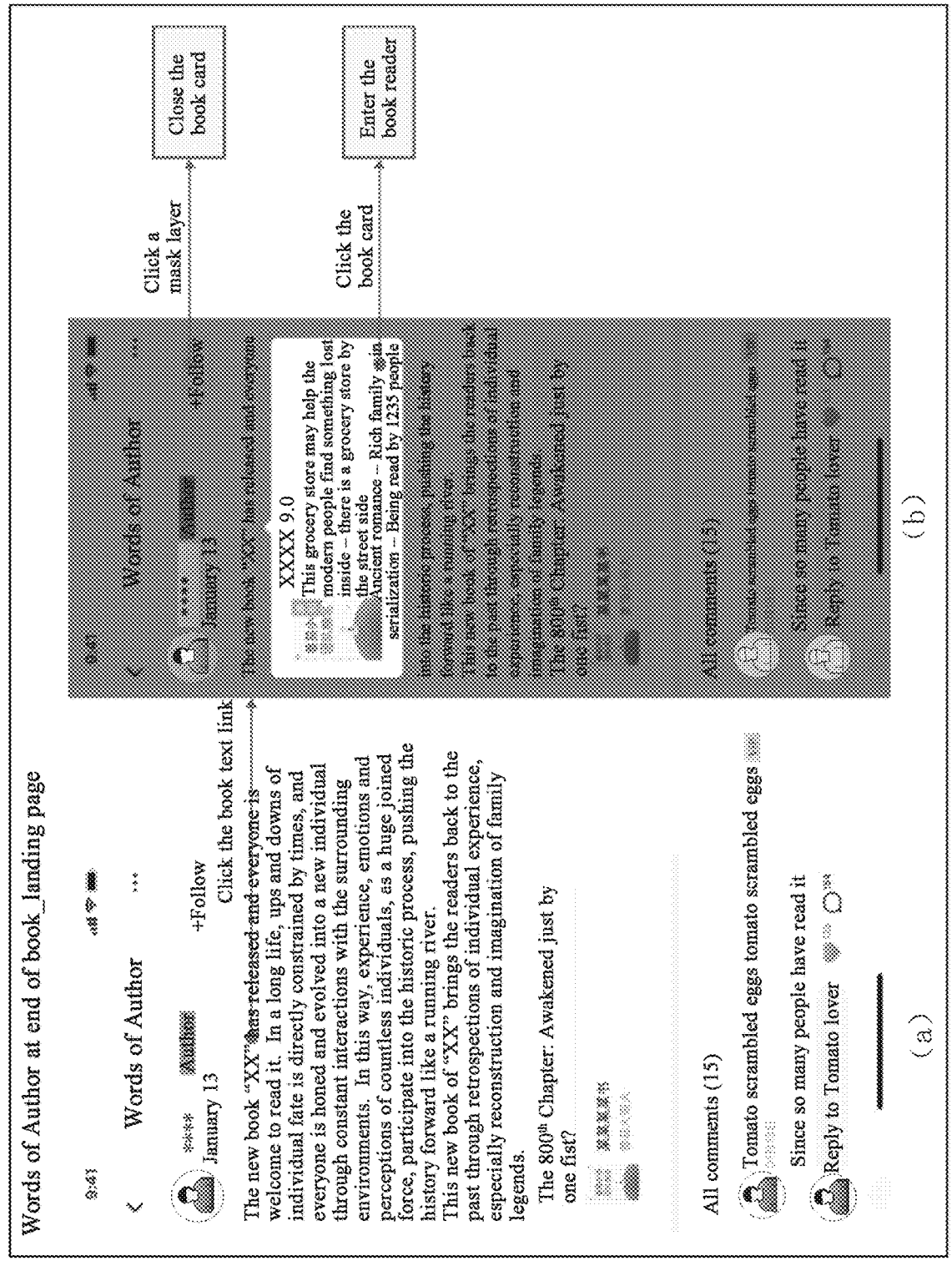
FIG. 3 illustrates a flowchart of a method for generating a book recommendation text provided in the embodiments of the present invention.

As shown in FIG. 3(*a*), the content of the recommendation text includes: the new book "XX" has arrived. Read it to show your support . . . . In a long life, ups and downs of individual fate is directly constrained by times . . . pushing the history forward like a running river. This recommendation text may be generated through the above step 103. Moreover, information like type (e.g., ancient romance), title and cover of the target book is also obtained. The recommendation text for "XX" is generated according to the above recommendation text and the related information of the target book, as shown in FIG. 3(*b*).

Optionally, the recommendation text may be a booking recommendation card or a book recommendation label, and is not restricted in this embodiment.

Step 105: pushing the book recommendation text to the reader.

Figure 4:
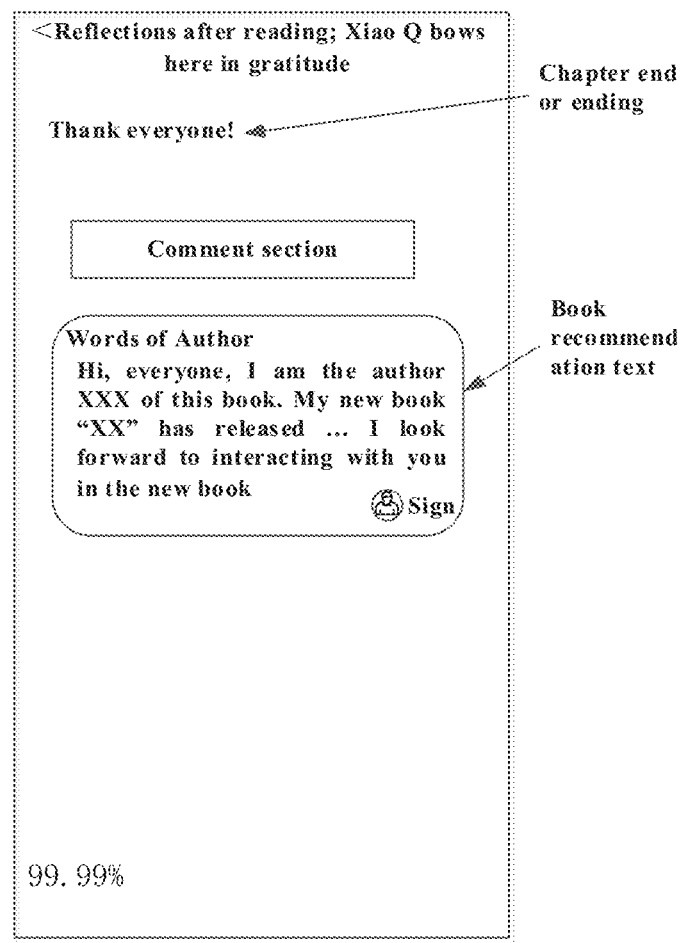
FIG. 4 illustrates a schematic diagram of inserting the book recommendation text to the chapter end or the ending provided by the embodiments of the present invention.

A specific implementation includes inserting the book recommendation text to the related location of the first book according to the insertion operation by the author at the related location of the first book or automatically, and displaying and pushing to the reader.

Wherein the related location of the first book includes ending or end of the final chapter of the first book. According to FIG. 4, the book recommendation text, such as book recommendation card of "Words of Author" is inserted at the ending of the first book below the comment section, e.g., when the reading progress of the first book reaches 99.99% or when the last page of the first book is being read.

It is to be appreciated that the book recommendation text may also be inserted at other locations of the first book, e.g., starting location or ending location of the comment section of the first book.

The method for book pushing provided by this embodiment establishes, according to the related features of the first book currently read by the reader, correlations with the target book, and generates a book recommendation text containing the recommendation text based on the contents of the first book and the target book. Since the target book recommended in the book recommendation text is relevant with the first book, the target book pushed is more pertinent. Therefore, the success rate of book pushing is increased, so as to ensure that the readership of the pushed book will not drop.

Wherein the purpose of book pushing is to add recommendations and new books of individuals to the last chapter of the finalized work, book reviews and book club, such that the readers may click the book title and directly read the pushed book, e.g., new book. Therefore, the new book may be read by more readers.

It is to be explained that the first book and the second book (collectively known as "book") described in this embodiment in general refer to a series of books or literary work of similar books, including but not limited to, books, novels, digest/literary selections, poetry, prose, picture/drawing works and the like.

Optionally, in a possible implementation of this embodiment, the above step 103 specifically includes: obtaining a key text of the first book, and/or a key text of the target book; determining, according to the key text of the first book and/or the key text of the target book, the recommendation text.

Wherein the key text indicates a content that may be used for generating the recommendation text, including but not limited to, contents, comments or related post contents of the first book and the target book.

Moreover, the obtaining a key text of the first book, and/or a key text of the target book includes: extracting contents, comments or related post contents of the first book and obtaining the key text of the first book; and/or obtaining, according to contents of the target book and related comments of readers after a brief reading, the key text of the target book.

For example, story contents, or marvelous chapter segments of the first book may be extracted in advance and the key text of the first book is generated according to the story contents, or marvelous chapter segments. Likewise, the key text of the target book is also generated according to the selected content of the target book, such as introduction, and brilliant segments of the first chapter of the target book and feeling of the reader after a brief reading of the target book.

Optionally, in a further possible implementation, the above step 103 also specifically includes: determining, according to a category of the first book and the target book or work similarity information, a recommendation text template, wherein the recommendation text template includes structure, contents and words of interests for writing the recommendation text; displaying the recommendation text template to the author and receiving contents written by the author based on the recommendation text template to generate the recommendation text.

Wherein the category of the target book at least includes any of: ancient style, romance, urban style, time-travelling style, fantasy and history style etc. Besides, when the target book does not belong to any of the above categories, it also may be self-defined, such as three-body novel. The work similarity information indicates a correlation between the target book and the first book. For example, the two books may be part one and part two, or the two books may be of the same time, or have the same leading character or depict a story within the same history period.

It should be appreciated that other information may also be considered upon determination of the recommendation text template. That is, the recommendation text template is determined collectively by the aforementioned category of the target book, work similarity information and other information.

Optionally, in a further possible implementation of this embodiment, the above step 104 specifically includes: determining, according to history editing contents of a draft and a draft content with conversion rate data above a preset value, contents and words of interests of the recommendation text; generating, according to a category of the first book and the target book or work similarity information and contents and arrangement and combination of the words of interests of the recommendation text, the recommendation text template.

Wherein the history editing contents may be history reader comments and the draft content with conversion rate data above a preset value refers to the historically aggregated draft content that was recommended as a draft to other readers with higher feedback. The work similarity information may include: the current first book and the target book have the same length, belong to the same or similar book category or are of the same theme/genre. The words of interest may be obtained based on the history reading data of the reader. The recommendation text template is generated through arrangements and combinations of the above contents.

Figure 5:
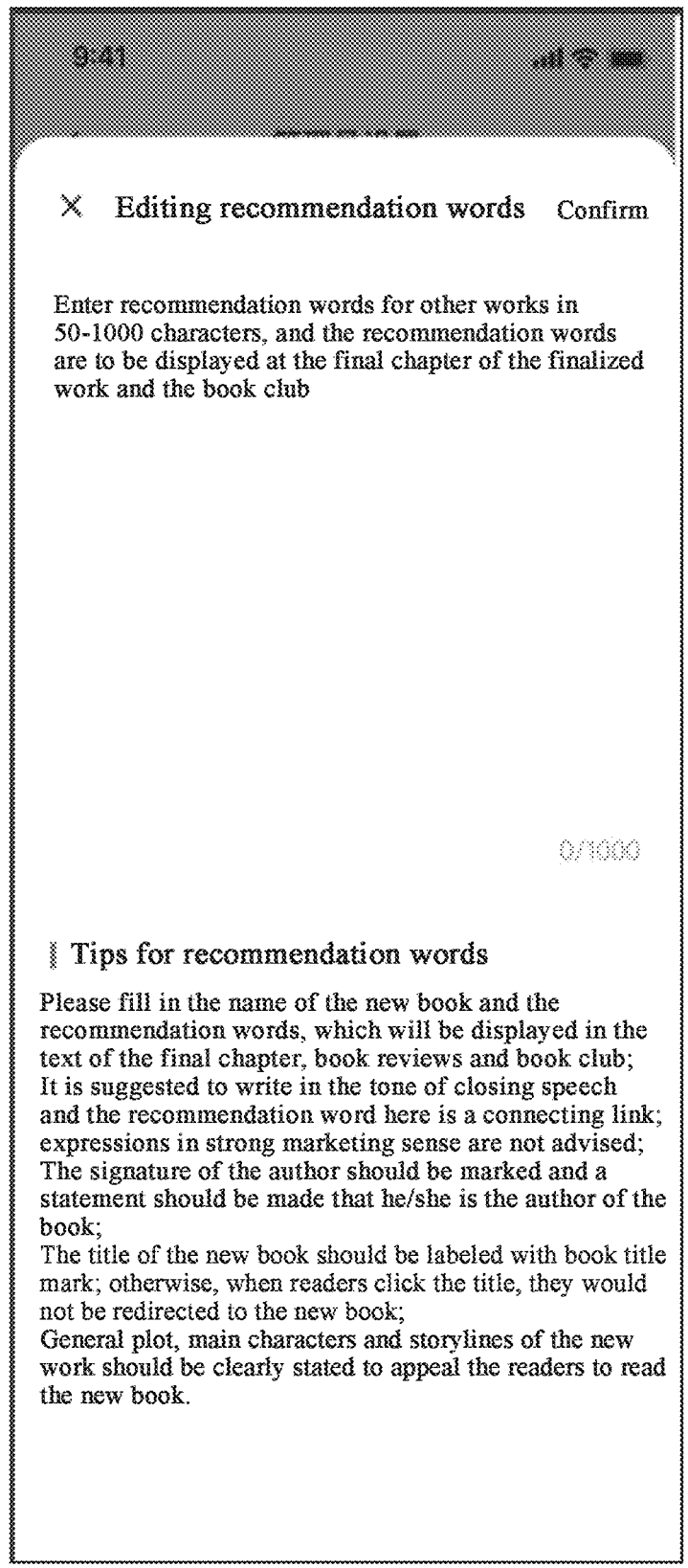
FIG. 5 illustrates a schematic diagram of editing of recommendation words provided in the embodiments of the present invention.

With reference to FIG. 5, the process of generating the book recommendation text also includes generating the book recommendation text based on at least one recommendation text template, wherein each recommendation text template includes: a recommendation word editing area and a recommendation word guideline tip content, wherein the recommendation word guideline is used to prompt the author to complete editing operations of recommendation words/recommendation text in the recommendation word editing area.

Furthermore, optionally, the determining, according to a category of the first book and the target book or work similarity information, a recommendation text template includes: searching, according to a category of the first book or work similarity information, at least one text template matching the category or the work similarity information; determining, based on a selection operation of the author, the recommendation text template in the at least one text template.

Figure 6:
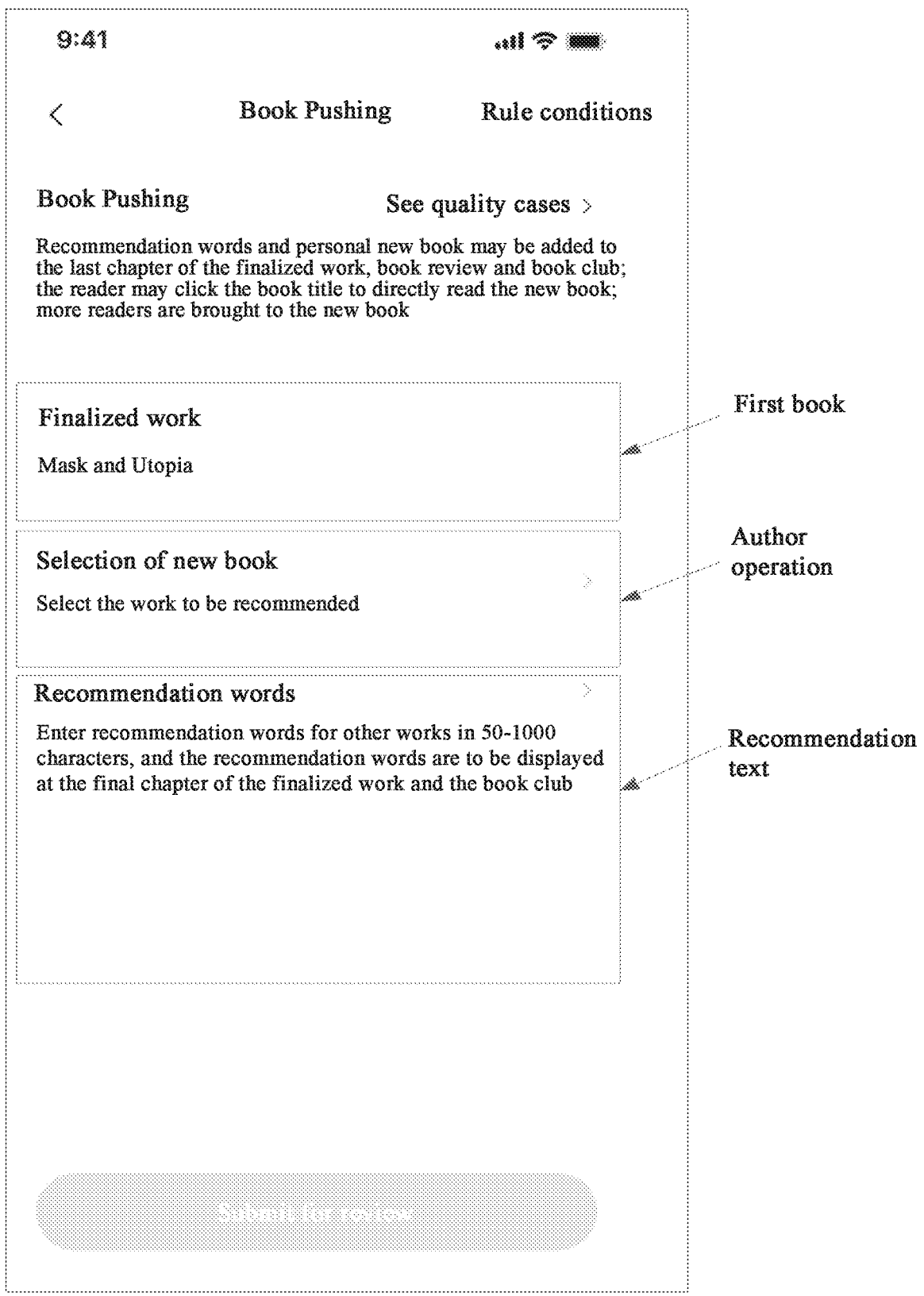
FIG. 6 illustrates a schematic diagram of generating a book text through author editing provided in the embodiments of the present invention.

For example, in another example, the category of the first book is history theme. One matching the category is searched in the at least one text template based on the category and the work similarity information, wherein each book category corresponds to one text template. For example, the server recommends to the author client three text templates corresponding to three categories, respectively being history theme, fantasy theme and cute baby theme. Each theme corresponds to different text contents. The author may select one from the three text templates, e.g., the text template of the history theme, as the recommendation text template. For instance, FIG. 6 illustrates the one recommendation text template selected by the author. The operation for editing the recommendation text content is completed based on the recommendation text template.

Optionally, in a further possible implementation of this embodiment, the related features of the first book include: a category of the first book, a state of the first book, and content of the first book etc.

Wherein the category of the first book has been described in the above embodiments and will not be repeated here. The state of the first book includes finalized and serialized states.

The determining, according to related features of the first book, a target book in at least one second book includes: obtaining history reading data of the reader and determining, according to the history reading data, at least one target related feature in the related features of the first book; searching in the at least one second book a second book matching the at least one target related feature and determining as the target book; wherein the matching at least includes: the first book has a same or similar category with the target book; a state of the first book indicates that the first book is about to end or already ended; the second book is in a serialized state; persona or plot of the second book is related to book contents of the first book.

For example, when it is determined, according to the history reading data, that the current reader previously read books in science-fictional suspense theme of the reader, a serialized book in sci-fi suspense style having characters or plots related to thrill and suspense theme is searched in the at least one second book based on the history reading data and determined as the target book.

Optionally, in a further embodiment, the above step 104 of determining, according to related features of the first book, a target book in at least one second book also includes: determining according to the related features of the first book and work recommendation score of each second book in the at least one second book, the target book, where a work recommendation score corresponding to the target book is greater than or equal to a threshold value.

Wherein the work recommendation score may be determined collectively based on popularity of the work among readers, content of the work, and association with a given old book etc. The specific score may be given by a system. For example, the system monitors and calculates "3-day reader retention rate" for a new book. If the "3-day reader retention rate" is relatively high, the corresponding work would have a relatively high recommendation score and gain more traffic.

Moreover, the so-called "3-day reader retention rate" may reflect the 3-day reader retention rate of a new book within a group of read sets. A higher 3-day reader retention rate indicates a better comprehensive quality of the book read by the readers. Accordingly, the work recommendation score for this book is higher and the platform would preferentially push the books in this category and increase the exposure rate of the book.

It should be appreciated that the above "3-day reader retention rate" is only one criterion for determining the work recommendation score. Other criteria may also be employed for a comprehensive score. The various criteria rated by the work recommendation score are not restricted in this embodiment.

Further, the threshold value may be understood as an average value or a minimum value for pushing. For example, the threshold value may 60 out of 100. In this example, the work recommendation score corresponding to each book in a list of new books may be obtained by evaluating all information of each new book collected by the terminal device. For example, the list of candidate second books contains three books and the respective work recommendation scores are rated to be 20, 50 and 80. As such, the work with the work recommendation score of 80 is determined as the target book.

In this embodiment, the work recommendation score of each second book is calculated and the second book with a higher work recommendation score is selected as the target book and pushed to the readers. Thus, the exposure rate of the target book is increased and more readers have the opportunity to read this book. The readership is also guaranteed.

Moreover, the method provided by this embodiment may increase the recommendation rate of the book. By associating the original book with the target book, the retention rate of the reader for the target book is also increased. As a result, the retention data of the target book are significantly improved and more readers are brought to the original author.

Optionally, in any of the above possible embodiments, the step 104 also specifically includes: generating, according to the recommendation text, the related information of the target book and an insertion operation by the author at a related location of the first book, the book recommendation text containing the recommendation text and related information of the target book.

Wherein the related location of the first book includes: ending or end of a final chapter of the first book.

Optionally, the above recommendation text also includes a hyperlink of the target book. The method also includes: receiving an operation of clicking the hyperlink by the reader, and jumping to a reading page of the target book in response to the operation.

Specifically, one implementation is to insert at the end of the old book a book recommendation text of "Words of Author" and a hyperlink as shown in FIG. 3. For example, a hyperlink address is configured on the book title of the book recommendation text, which hyperlink address is used for associating a reading page of the new book. When an operation of clicking the hyperlink by the reader is received, e.g., the reader clicks the book name of "XX", the book recommendation text (i.e., book card) corresponding to the new book is illumed, to prompt the reader to enter a book reader for reading. A grey mask layer is provided on the book recommendation text. If an operation of clicking the grey mask layer by the user is received, the current data card is closed.

Optionally, the method also includes: if the one-click connection to the book reader fails due to network reasons, e.g., the system could not jump to the new book reading interface on account of network error, the system prompt the readers that there is a network error at present and they may try again later, through toast.

The method provided by this embodiment sets up a hyperlink address of the target book in the book recommendation card, such that the reader, after clicking the hyperlink address, may directly jump to the target book reader. Therefore, the reader can rapidly switch to reading the target book and the reading experience of the reader is also improved.

Figure 7:
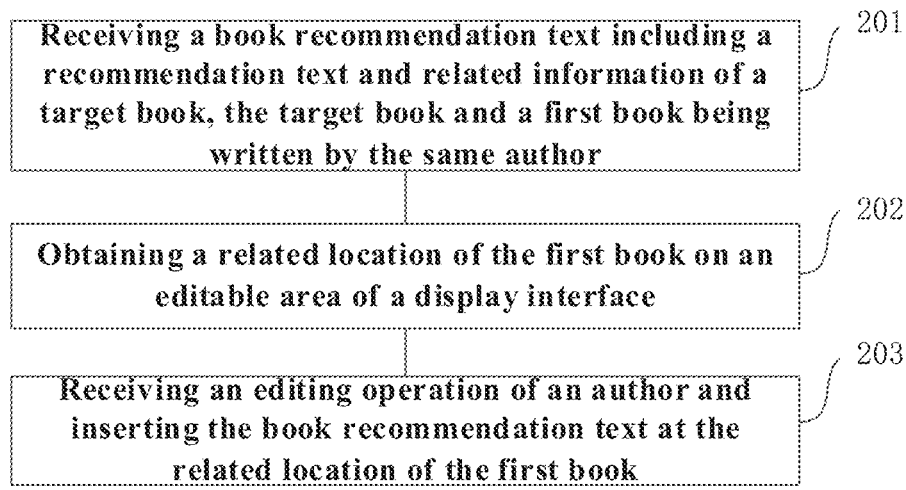
FIG. 7 illustrates a flowchart of a further method for book pushing provided in the embodiments of the present invention.

On the basis of the method for book pushing provided by the above embodiment, this embodiment also proposes a method for generating a book recommendation text. The method generates the aforementioned book recommendation text. Specifically, the method may be applied to a terminal device, such as mobile phone terminal. With reference to FIG. 7, the method for generating the book recommendation text includes steps of:

Step 201: receiving a book recommendation text including a recommendation text and related information of a target book, the target book and a first book being written by the same author.

The book recommendation text includes, but not limited to, book recommendation card, book recommendation label and book recommendation advertisement etc. The recommendation text and the related information of the target book include, but not limited to, category, content, comment and other information of the book. This embodiment is not restricted in this regard.

Moreover, the book recommendation text includes: identification information of the author and title and recommendation words of the target book. Further, the identification information of the author may be information for identifying the user identity, including pen name of the author, user name, ID number and the like. The title of the target book may be in the form of texts, numbers and characters etc. The recommendation words may be written according to the contents of the target book and reader preferences to attract readers. In addition, the book recommendation card also may include other contents, such as author profile and logo etc.

Step 202: obtaining a related location of the first book on an editable area of a display interface.

Wherein the related location of the first book includes a final chapter or an ending of the first book; and the step 202 specifically includes: inserting the book recommendation text at a final chapter or an ending of the first book.

Step 203: receiving an editing operation of an author and inserting the book recommendation text at the related location of the first book.

For example, in the previous FIG. 5, after editing the recommendation words/recommendation text, the author submits them for examination. Once passing the examination, the book recommendation text is automatically inserted at the final chapter or the ending of the current first book. For example, according to FIG. 4, the book recommendation text of "Words of Author" is generated and inserted to the last page. For instance, the book recommendation text is inserted after the comment section on the last page of the current book. The comment section is provided for writing down reviews and comments by the readers after reading the current book.

Before the above step 203 of this embodiment (i.e., inserting the book recommendation text), the above method also includes: displaying a recommendation text template on a display interface, wherein the recommendation text template includes related information of the first book, related information of the second book and recommendation text content; generating, according to the recommendation text content, the related information of the first book and/or the related information of the second book, a book recommendation text.

The related information of the first book and/or the target book includes: title of the first book and/or the target book, book type, book comments or related post contents etc. The recommendation text content may be determined according to the category of the first book and the second book or work similarity information.

Wherein while editing the recommendation words on the recommendation text template, the author may click an option of "viewing select cases" on the display interface as shown in FIG. 5, and select the recommendation word template from the select cases stored in the database for writing the recommendation words.

Furthermore, in one specific implementation, the displaying a recommendation text template on a display interface includes: obtaining at least one candidate text template matching related information of the first book, the related information of the first book including a category of the first book and work similarity information; receiving a selection operation by the user in the at least one candidate text template, and determining a selected one as the recommendation text template in response to the selection operation.

For example, the first book in the science-fiction category and its work similarity information contains three-body theme. Based on the science-fiction category information and the work similarity, a text template belonging to the science-fiction category and having a relatively high similarity is searched in the at least one text template as a candidate text template, which is provided for the author as an option. When the author selects one text template, the selected template is determined as a final recommendation text template for generating the recommendation text, which template is provided to the author for editing the recommendation words.

Optionally, the generating, according to the recommendation text content, the related information of the first book and/or the related information of the second book, a book recommendation text includes: determining, according to contents, comments or related post contents of the first book and/or contents of the target book and related comments of readers after a brief reading, the recommendation text content; generating, according to the recommendation text content, the related information of the first book and/or the related information of the second book, the book recommendation text.

Specifically, the procedure of generating, according to the recommendation text content, the related information of the first book and/or the related information of the second book, a book recommendation text has been described in details with reference to the previous embodiments and will not be repeated here.

The method provided by this embodiment receives, at the author-side client, the book recommendation text containing the recommendation text and the related information of the target book and inserts the book recommendation text to the related location of the first book, so as to push the target new book to the readers. Because the recommendation text in the book recommendation text is determined according to contents, comments or related post contents of the first book and/or contents of the target book and related comments of readers after a brief reading of the target book, the target book pushed to the current readers is more accurate and the quality of traffic attracted by the new book is also improved.

Optionally, in this embodiment, the above book recommendation text also includes a link address of the target book. For example, the title of the target book is used as the link address and inserted into the book pushing card. When an operation of clicking the link address by the author is received, the system jumps to the reading interface of the target book in response to the operation, such that the reader may quickly switch to reading the new book and the reading experience of the reader is enhanced.

Figure 8:
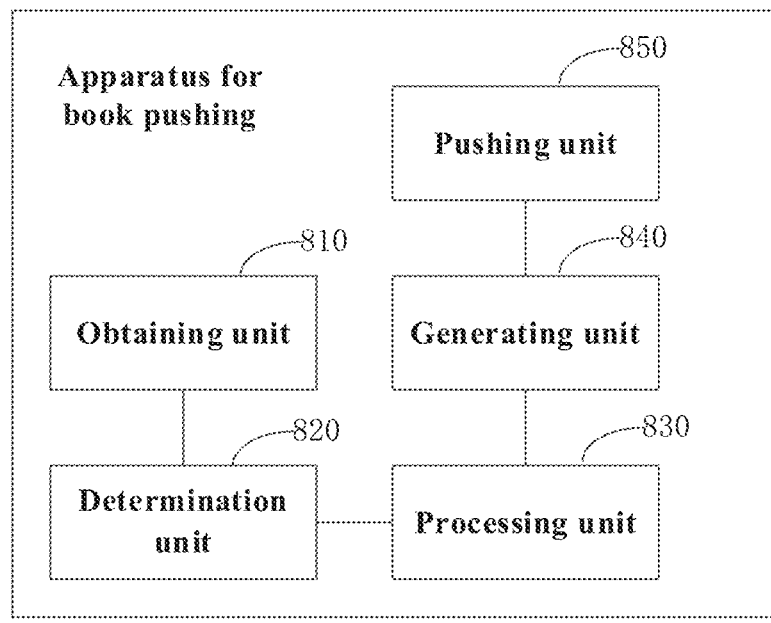
FIG. 8 illustrates a structural diagram of an apparatus for book pushing provided in the embodiments of the present invention.

Embodiments of the present invention also disclose an apparatus for book pushing, which is provided for implementing the above method for book pushing according to FIG. 2. Specifically, according to FIG. 8, the apparatus includes: an obtaining unit 810, a determination unit 820, a processing unit 830, a generating unit 840 and a pushing unit 850. Besides, the apparatus also may include other units and modules, such as storage unit etc.

Wherein the obtaining unit 810 is used for obtaining a first book, the first book being a book currently read by a reader.

The determining unit 820 is provided for determining, according to related features of the first book, a target book in at least one second book, the second book and the first book being written by the same author.

The processing unit 830 is used for determining, according to contents of the target book and/or the first book, a recommendation text.

The generating unit 840 is provided for generating, according to the recommendation text and related information of the target book, a book recommendation text of the target book.

The pushing unit 850 is used for pushing the book recommendation text to the reader.

Optionally, in a specific implementation, the above processing unit 840 is specifically used for obtaining a key text of the first book, and/or a key text of the target book; determining, according to the key text of the first book and/or the key text of the target book, the recommendation text.

Optionally, in another specific implementation, the above obtaining unit 810 is also used for extracting contents, comments or related post contents of the first book and obtaining the key text of the first book; and/or obtaining, according to contents of the target book and related comments of readers after a brief reading, the key text of the target book.

Optionally, in a further specific implementation, the processing unit 830 is specifically provided for determining, according to a category of the first book and the target book or work similarity information, a recommendation text template, wherein the recommendation text template includes structure, contents and words of interests for writing the recommendation text.

Moreover, the above apparatus also includes a display unit and a receiving unit. The display unit is used for displaying the recommendation text template to the author and the user unit is provided for receiving contents written by the author based on the recommendation text template. The recommendation text is generated through the generation unit 840.

Optionally, in a further specific implementation, the processing unit 830 is also provided for determining, according to history editing contents of a draft and a draft content with conversion rate data above a preset value, contents and words of interests of the recommendation text; generating, according to a category of the first book and the target book or work similarity information and contents and arrangement and combination of the words of interests of the recommendation text, the recommendation text template.

Optionally, in a further specific implementation, the processing unit 830 is also used for searching, according to a category of the first book or work similarity information, at least one text template matching the category or the work similarity information; determining, based on a selection operation of the author, the recommendation text template in the at least one text template.

Optionally, in a further specific implementation, the related features of the first book include at least one of: a category of the first book, a state of the first book, and content of the first book.

The determination unit 820 is also provided for obtaining history reading data of the reader and determining, according to the history reading data, at least one target related feature in the related features of the first book; searching in the at least one second book a second book matching the at least one target related feature and determining as the target book.

Wherein the matching at least includes: the first book has a same or similar category with the target book; a state of the first book indicates that the first book is about to end or already ended; the second book is in a serialized state; persona or plot of the second book is related to book contents of the first book.

Optionally, in a further specific implementation, the determination unit 820 is also used for determining according to the related features of the first book and work recommendation score of each second book in the at least one second book, the target book, where a work recommendation score corresponding to the target book is greater than or equal to a threshold value.

Optionally, in a further specific implementation, the processing unit 830 is also provided for generating, according to the recommendation text, the related information of the target book and an insertion operation by the author at a related location of the first book, the book recommendation text containing the recommendation text and related information of the target book.

Wherein the related location of the first book includes: ending or end of a final chapter of the first book.

Furthermore, optionally, the book recommendation text also includes a hyperlink of the target book; the receiving unit is also used for receiving an operation of clicking the hyperlink by the reader, and the processing unit 830 is also used for jumping to a reading page of the target book in response to the operation.

The apparatus for book pushing provided by this embodiment establishes, according to the related features of the first book currently read by the reader, an association with the target book, and generates a book recommendation text containing the recommendation text based on the contents of the first book and the target book. Since the target book recommended in the book recommendation text is relevant with the first book, the target book pushed is more pertinent. Therefore, the success rate of book pushing is increased, so as to ensure that the readership of the pushed book will not drop.

Figure 9:
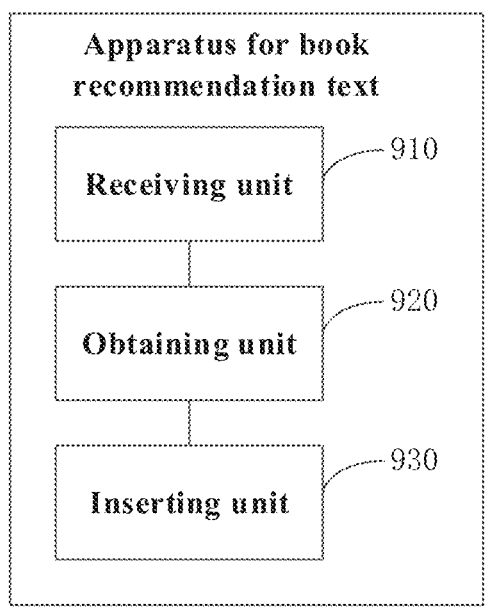
FIG. 9 illustrates a structural diagram of an apparatus for generating a book recommendation text provided in the embodiments of the present invention.

On the basis of the method for generating a book recommendation text according to the above embodiments, this embodiment also correspondingly provides an apparatus for generating a book recommendation text. As shown in FIG. 9, the apparatus includes: a receiving unit 910, an obtaining unit 920 and an inserting unit 930. Moreover, the apparatus also may include other units and modules, such as storage unit etc.

Wherein the receiving unit 910 is used for receiving a book recommendation text including a recommendation text and related information of a target book, the target book and a first book being written by the same author.

The obtaining unit 920 is provided for obtaining a related location of the first book on an editable area of a display interface.

The inserting unit 930 is used for receiving an editing operation of an author and inserting the book recommendation text at the related location of the first book.

Optionally, in one specific implementation, the above apparatus also includes a display unit and a generating unit.

The display unit is provided for displaying a recommendation text template on a display interface, wherein the recommendation text template includes related information of the first book, related information of the second book and recommendation text content.

The generating unit is used for generating, according to the recommendation text content, the related information of the first book and/or the related information of the second book, a book recommendation text.

Optionally, in a further specific implementation, the obtaining unit 920 is also used for obtaining at least one candidate text template matching related information of the first book, the related information of the first book including a category of the first book and work similarity information.

The receiving unit 910 is also provided for receiving a selection operation by the user in the at least one candidate text template, and determining a selected one as the recommendation text template in response to the selection operation.

Optionally, in a further specific implementation, the generating unit is also used for determining, according to contents, comments or related post contents of the first book and/or contents of the target book and related comments of readers after a brief reading, the recommendation text content; generating, according to the recommendation text content, the related information of the first book and/or the related information of the second book, the book recommendation text.

Optionally, in a further specific implementation, the inserting unit 930 is also used for inserting the book recommendation text at a final chapter or an ending of the first book.

Moreover, it is to be explained that the above described apparatus embodiments are only exemplary, wherein the units described as separate components may or may not be physically discrete. The objective of the solution according to the embodiments may be fulfilled by selecting some or all of the modules depending on the actual needs. In addition, in the drawings according to the apparatus embodiments of the present invention, connections between the modules indicate communication links therebetween, and the communication link may be specifically implemented as one or more communication buses or signal wires.

Figure 10:
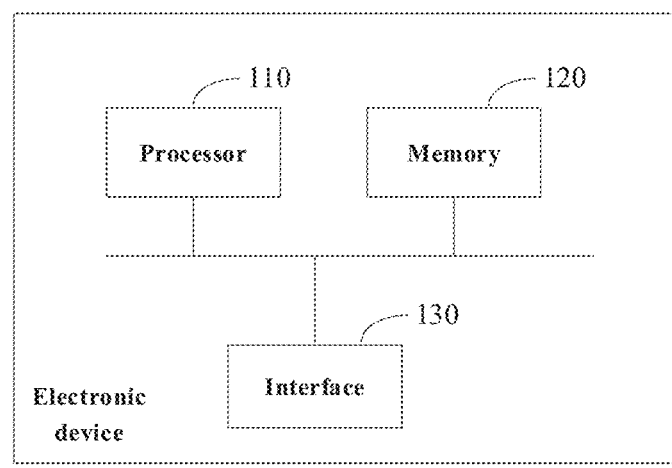
FIG. 10 illustrates a structural diagram of an electronic device provided in the embodiments of the present invention.

Furthermore, embodiments of the present invention also provide an electronic device, as shown in FIG. 10. The electronic device may include a processor 110 and a memory 120 connected with each other via a bus or in other ways.

According to FIG. 10, the processor and the memory are connected, for example, by a bus. Additionally, the electronic device also includes at least one interface 130, which may be a communication interface or other interface. This embodiment is not restricted in this regard.

Wherein the processor 110 may be a Central Processing Unit (CPU). The processor 110 also may be other general-purpose processor, Digital Signal Processor (DSP), Application Specific Integrated Circuit (ASIC), Field-Programmable Gate Array (FPGA) or other programmable logic devices, discrete gates or transistor logic devices, discrete hardware assemblies, or combinations thereof.

The memory 120 is a non-transient computer-readable storage medium for storing non-transient software programs, and non-transient computer-executable programs and modules, e.g., the method for book pushing, the method for generating a book recommendation text and corresponding program instructions/modules in the embodiments of the present invention. The processor 110 executes various functional applications and data processing of the processor by running the non-transient software programs, instructions and modules stored in the memory 120. That is, the processor implements the method for book pushing and the method for generating book recommendation text in the above method embodiments.

The memory 120 may include a program storage area for storing operating system and application programs required by at least one function and a data storage area for storing data created by the processor 110. Besides, the memory 120 may be a high random access cache, and also many include a non-transient memory, such as at least one magnetic disk storage device, flash storage device, or other non-transient solid-state storage devices. In some embodiments, the memory 120 may optionally include a memory disposed remotely with respect to the processor 110. The remote memory may be connected to the processor 110 via the network. Examples of the above network include, but not limited to, Internet, Intranet, LAN, mobile communication network and combinations thereof.

Furthermore, at least one interface 130 is used for communications between the electronic device and an external device, e.g., communication with the server. Optionally, the at least one interface 130 may also be used for connecting an external input/output device, such as keyboard and display screen etc.

The one or more modules are stored in the memory 120. The modules, when executed by the processor 110, perform the method for book pushing according to FIG. 2 and the method for generating a book recommendation text illustrated in FIG. 7.

Those skilled in the art can understood that all or part of the flows in the above methods according to the embodiments may be completed by hardware related to the computer program instructions. The computer program instructions may be stored in the computer-readable storage medium and may perform the flows according to the above method embodiments when executed. The storage medium may be magnetic disk, optic disk, Read-Only Memory (ROM), Random Access Memory (RAM), Flash Memory, Hard Disk Drive (HDD) or Solid-State Drive (SSD) etc. The storage medium also may include combinations of the above types of memories.

Although embodiments of the present invention have been described with reference to the drawings, those skilled in the art may make various modifications and variations without deviating from the spirit and scope of the present invention. The modifications and variations all fall within the scope defined by the attached claims.

The invention claimed is:

1. A method for book pushing, comprising:
obtaining a first book, the first book being a book currently read by a reader;
determining, according to related features of the first book, a target book in at least one second book, the second book and the first book being written by the same author;
determining, according to contents of the target book and/or the first book, a recommendation text;
generating, according to the recommendation text and related information of the target book, a book recommendation text of the target book; and
pushing the book recommendation text to the reader,
wherein determining, according to the contents of the target book and/or the first book, the recommendation text includes:
determining, according to a category of the first book and the target book or work similarity information, a recommendation text template, wherein the recommendation text template includes structure, contents and words of interests for writing the recommendation text; and
displaying the recommendation text template to the author and receiving contents written by the author based on the recommendation text template to generate the recommendation text.

2. The method of claim 1, wherein the determining, according to contents of the target book and/or the first book, a recommendation text includes:
obtaining a key text of the first book, and/or a key text of the target book; and
determining, according to the key text of the first book and/or the key text of the target book, the recommendation text.

3. The method of claim 2, wherein the obtaining a key text of the first book, and/or a key text of the target book includes:
extracting contents, comments or related post contents of the first book and obtaining the key text of the first book; and/or obtaining, according to contents of the target book and related comments of readers after a brief reading, the key text of the target book.

4. The method of claim 1, wherein the determining, according to a category of the first book and the target book or work similarity information, a recommendation text template includes:
determining, according to history editing contents of a draft and a draft content with conversion rate data above a preset value, contents and words of interests of the recommendation text; and
generating, according to a category of the first book and the target book or work similarity information and contents and arrangement and combination of the words of interests of the recommendation text, the recommendation text template.

5. The method of claim 1, wherein the determining, according to a category of the first book and the target book or work similarity information, a recommendation text template includes:
searching, according to a category of the first book or work similarity information, at least one text template matching the category or the work similarity information; and determining, based on a selection operation of the author, the recommendation text template in the at least one text template.

6. The method of claim 1, wherein the related features of the first book include at least one of: a category of the first book, a state of the first book, and content of the first book;
   wherein determining, according to related features of the first book, a target book in at least one second book includes:
      obtaining history reading data of the reader and determining, according to the history reading data, at least one target related feature in the related features of the first book; and
      searching in the at least one second book a second book matching the at least one target related feature and determining as the target book, and
   wherein the matching at least includes: the first book has a same or similar category with the target book; a state of the first book indicates that the first book is about to end or already ended; the second book is in a serialized state; persona or plot of the second book is related to book contents of the first book.

7. The method of claim 6, wherein the determining, according to related features of the first book, a target book in at least one second book further includes:
   determining, according to the related features of the first book and work recommendation score of each second book in the at least one second book, the target book, where a work recommendation score corresponding to the target book is greater than or equal to a threshold value.

8. The method of claim 1, wherein the generating, according to the recommendation text and related information of the target book, a book recommendation text of the target book includes:
   generating, according to the recommendation text, the related information of the target book and an insertion operation by the author at a related location of the first book, the book recommendation text containing the recommendation text and related information of the target book.

9. The method of claim 8, wherein the related location of the first book includes: ending or end of a final chapter of the first book.

10. The method of claim 9, wherein the book recommendation text further includes a hyperlink of the target book, and
    wherein the method further comprises, after pushing the book recommendation text to the reader:
       receiving an operation of clicking the hyperlink by the reader, and jumping to a reading page of the target book in response to the operation.

11. A method for inserting a book recommendation text into an E-book, the method comprising:
    receiving a book recommendation text including a recommendation text and related information of a target book via a first control, the target book and a first book being written by the same author, the first book being an E-book, and generation of the recommendation text comprising:
       determining, according to a category of the first book and the target book or work similarity information, a recommendation text template, wherein the recommendation text template includes structure, contents and words of interests for writing the recommendation text; and
       displaying the recommendation text template to the author and receiving contents written by the author based on the recommendation text template to generate the recommendation text;
    obtaining a related location of the first book on an editable area of a display interface for inserting the book recommendation text; and
    receiving an editing operation of the author via a second control and inserting the book recommendation text at the related location of the first book.

12. The method of claim 11, further comprising, before inserting the book recommendation text at the related location of the first book:
    displaying a book recommendation text template on a display interface, wherein the book recommendation text template includes related information of the first book, related information of the second book, and recommendation text content; and
    generating, according to the recommendation text content, the related information of the first book, and/or the related information of the second book, the book recommendation text.

13. The method of claim 12, wherein the displaying a book recommendation text template on a display interface includes:
    obtaining at least one candidate text template matching related information of the first book, the related information of the first book including a category of the first book and work similarity information; and
    receiving a selection operation by the user in the at least one candidate text template, and determining a selected one as the book recommendation text template in response to the selection operation.

14. The method of claim 12, wherein the generating, according to the recommendation text content, the related information of the first book, and/or the related information of the second book, the book recommendation text includes:
    determining, according to contents, comments, or related post contents of the first book and/or contents of the target book and related comments of readers after a brief reading, the recommendation text content; and
    generating, according to the recommendation text content, the related information of the first book, and/or the related information of the second book, the book recommendation text.

15. The method of claim 11, wherein the inserting the book recommendation text at the related location of the first book includes:
    inserting the book recommendation text at a final chapter or an ending of the first book.

16. An electronic device, comprising a memory and a processor, wherein
    the memory stores therein computer program instructions; and
    the processor, when executing the computer program instructions, implements a method comprising:
       obtaining a first book, the first book being a book currently read by a reader;
       determining, according to related features of the first book, a target book in at least one second book, the second book and the first book being written by the same author;
       determining, according to contents of the target book and/or the first book, a recommendation text;
       generating, according to the recommendation text and related information of the target book, a book recommendation text of the target book; and pushing the book recommendation text to the reader, and wherein determining, according to the contents of the target book and/or the first book, the recommendation text includes:
- determining, according to a category of the first book and the target book or work similarity information, a recommendation text template, wherein the recommendation text template includes structure, contents and words of interests for writing the recommendation text; and
- displaying the recommendation text template to the author and receiving contents written by the author based on the recommendation text template to generate the recommendation text.

17. The electronic device of claim 16, wherein the determining, according to contents of the target book and/or the first book, a recommendation text includes:
- obtaining a key text of the first book, and/or a key text of the target book; and
- determining, according to the key text of the first book and/or the key text of the target book, the recommendation text.

18. The electronic device of claim 17, wherein the obtaining a key text of the first book, and/or a key text of the target book includes:
- extracting contents, comments or related post contents of the first book and obtaining the key text of the first book; and/or obtaining, according to contents of the target book and related comments of readers after a brief reading, the key text of the target book.

19. The electronic device of claim 16, wherein the determining, according to a category of the first book and the target book or work similarity information, a recommendation text template includes:
- determining, according to history editing contents of a draft and a draft content with conversion rate data above a preset value, contents and words of interests of the recommendation text; and
- generating, according to a category of the first book and the target book or work similarity information and contents and arrangement and combination of the words of interests of the recommendation text, the recommendation text template.

20. The electronic device of claim 16, wherein the determining, according to a category of the first book and the target book or work similarity information, a recommendation text template includes:
- searching, according to a category of the first book or work similarity information, at least one text template matching the category or the work similarity information; and
- determining, based on a selection operation of the author, the recommendation text template in the at least one text template.

* * * * *